(No Model.)
J. F. DUKE.
MANUFACTURE OF MANTLES FOR INCANDESCENT GAS LAMPS.
No. 586,994.  Patented July 27, 1897.
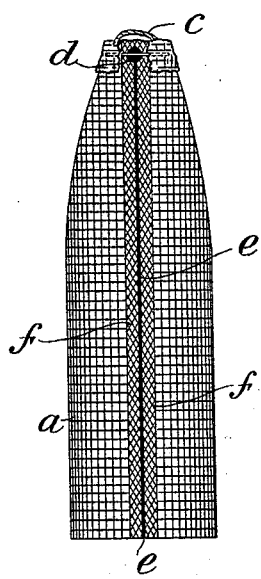
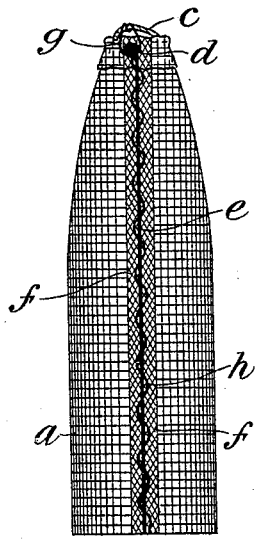
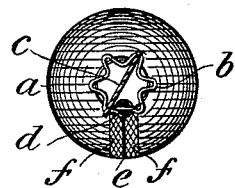
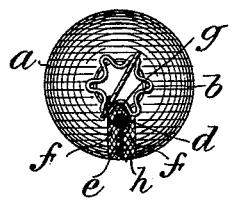
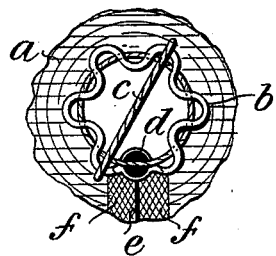
WITNESSES:
Fred White
Thomas F Wallace
INVENTOR:
John Frederick Duke,
By his Attorneys:

UNITED STATES PATENT OFFICE.

JOHN FREDERICK DUKE, OF LONDON, ENGLAND.

MANUFACTURE OF MANTLES FOR INCANDESCENT GAS-LAMPS.

SPECIFICATION forming part of Letters Patent No. 586,994, dated July 27, 1897.

Application filed January 13, 1897. Serial No. 619,049. (No model.)

*To all whom it may concern:*

Be it known that I, JOHN FREDERICK DUKE, of London, England, have invented certain new and useful Improvements in the Manufacture of Mantles or Incandescing Bodies for Incandescent Gas-Lamps, of which the following is a specification.

My invention has reference to the manufacture of mantles or incandescing bodies (hereinafter referred to as "mantles") for incandescent gas-lamps; and its object is to render them self-lighting by the action of the gas itself (when this is turned on) upon an automatic gas-igniter, preferably of the kind described in the specification of my Patent No. 554,249—that is to say, a block of meerschaum or other porous material containing in its pores platinum-black or any suitable metal of the platinum group or combination of such metals.

According to my present invention I draw or paint a line (preferably a very fine line) of highly-concentrated solution of platinum bichlorid from the upper part of the mantle toward the lower part. This is preferably done before the tulle or foundation of the mantle has been burned out. After the tulle has been burned out, during which process the platinum bichlorid will be converted into metallic platinum in a finely-divided state, I produce over the line of platinum a streak of incandescing material, preferably containing an exceedingly small proportion of metallic platinum. In order to produce this streak I preferably employ a solution of carbonate of lime, (which can readily be obtained from a solution of hydrate of lime in a saturated solution of carbonic dioxid in water, or by other suitable process,) the solution also preferably containing an extremely small proportion of platinum bichlorid. I have found that one part of platinum bichlorid to twenty thousand parts of the carbonate of lime is a suitable proportion for the purpose of this invention. The bichlorid of platinum so contained becomes converted into metallic platinum on its being submitted to the heat of the gas-flame.

To the mantle and in contact with the upper end of the line of platinum I fit the porous block, such as hereinbefore referred to, which contains platinum-black or other suitable metal of the platinum group in its pores.

When the gas is turned on and comes in contact with the porous block, this becomes heated to a red heat. This heat is communicated to the line of platinum on the mantle, and this platinum in its turn communicates it to the lime with which the very small amount of platinum has become mixed by the addition of platinum bichlorid. Owing to the presence of this finely-divided platinum the heat is transmitted from the platinum line to the carbonate of lime, which is therefore converted into oxid of lime, which becomes incandescent and ignites the gas.

Sometimes I employ one or more platinum wires in the mantle, the said wire or wires being attached to the block and interlaced with the material of the mantle and running with the impregnated line.

The streak of lime or other suitable material containing the extremely small proportion of metallic platinum as hereinbefore described may be dispensed with, the line of platinum with or without one or more platinum wires as hereinbefore described being then depended upon in conjunction with the porous block to produce sufficient heat to ignite the gas. In this case the line of platinum should preferably be wider.

In the accompanying drawings, Figure 1 is a side view illustrating a mantle made in accordance with my invention. Fig. 2 is a plan of same. Fig. 3 is a part plan on a larger scale. Fig. 4 is a side view illustrating a modification. Fig. 5 is a plan of the mantle illustrated in Fig. 4.

Referring first to Figs. 1, 2, and 3, $a$ is the mantle; $b$, the ordinary asbestos thread to fasten or draw in the mantle at the top. $c$ is the loop usually employed by which to suspend the mantle to the ordinary fork of the lamp. $d$ is the block of meerschaum or other porous material containing platinum-black in its pores. It can be attached to the mantle at the upper part in any convenient way. It is shown as strung onto the thread $b$. $e$ indicates the line of platinum produced by drawing or painting a line of highly-concentrated solution of platinum bichlorid upon the mantle, this bichlorid being subsequently converted into metallic platinum, as hereinbefore described. *ff* indicates the streak of carbonate of lime or incandescing material mixed with the very small proportion of platinum, as hereinbefore described.

Referring now to Figs. 4 and 5, the block *b* is here shown as hung by a platinum wire *g* to the loop *c*, so as to hang down and rest upon the exterior of the mantle. *h* represents a platinum wire attached at its upper end to the block *d* and interlaced with the material of the mantle, so as to extend concurrently with the line of platinum *e*.

What I claim, and desire to secure by Letters Patent, is—

1. In a mantle or incandescing body for incandescent gas-lamps the combination with an automatic gas-igniter at the upper part of said body, of a line of metallic platinum in a finely-divided state on said body, and in contact with said igniter, and a streak of incandescing material preferably mixed with a very small proportion of metallic platinum in a finely-divided state, said streak being applied upon said line, substantially as and for the purpose set forth.

2. In a mantle or incandescing body for incandescent gas-lamps, the combination with an automatic gas-igniter at the upper part of said body of a line of metallic platinum in a finely-divided state on said body and in contact with said igniter substantially as and for the purpose set forth.

3. In a mantle or incandescing body for incandescent gas-lamps, the combination with an automatic gas-igniter at the upper part of said body, of a line of metallic platinum in a finely-divided state on said body, and in contact with said igniter, a streak of incandescing material preferably mixed with a very small proportion of metallic platinum in a finely-divided state, said streak being applied upon said line, and a platinum wire attached to said igniter and extending down the incandescing body concurrently with said line, substantially as and for the purpose set forth.

4. In a mantle or incandescing body for incandescent gas-lamps, the combination with an automatic gas-igniter at the upper part of said body, of a line of metallic platinum in a finely-divided state, and a platinum wire attached to said igniter and extending down the incandescing body concurrently with said line, substantially as and for the purpose set forth.

In witness whereof I have hereunto signed my name in the presence of two subscribing witnesses.

JOHN FREDERICK DUKE.

Witnesses:
GEORGE C. BACON,
ROBERT M. SPEARPOINT.